United States Patent [19]

Kauffman et al.

[11] 4,337,111

[45] Jun. 29, 1982

[54] METHOD OF OBTAINING STRONG AND DURABLE ADHESION TO RUBBER THROUGH CHEMICAL COVALENT BONDS

[75] Inventors: Karl C. Kauffman, Ridgecrest; Martin H. Kaufman, China Lake, both of Calif.

[73] Assignee: The United States of America as represented by the Secretary of the Navy, Washington, D.C.

[21] Appl. No.: 947,971

[22] Filed: Oct. 2, 1978

[51] Int. Cl.$^3$ ............................................. C09J 5/02
[52] U.S. Cl. ........................... 156/307.5; 156/307.3; 156/315; 156/330; 427/208.2; 427/400; 427/412.1; 427/412.3; 428/354; 428/413; 428/414; 428/420; 428/519
[58] Field of Search ............... 156/310, 322, 315, 331, 156/309, 330, 280, 307.3, 307.5; 427/207 A, 407 C, 400, 407 E; 428/354, 420, 413, 519, 414; 526/342

[56] References Cited

U.S. PATENT DOCUMENTS

| | | |
|---|---|---|
| 2,467,322 | 4/1949 | Lightbown et al. ............... 156/309 |
| 3,068,117 | 12/1962 | Korpman ........................... 428/414 |
| 3,326,742 | 6/1967 | Shepherd .......................... 428/409 |
| 3,406,087 | 10/1968 | Potter ................................ 156/330 |
| 3,528,473 | 9/1970 | Torti et al. ......................... 152/330 |
| 3,655,818 | 4/1972 | McKown ....................... 427/207 A |
| 3,895,166 | 7/1975 | Wood ................................ 428/383 |
| 3,939,294 | 2/1976 | Fieldhouse ........................ 428/424 |
| 3,962,011 | 6/1976 | Van Gils ....................... 156/110 A |

*Primary Examiner*—John J. Gallagher
*Attorney, Agent, or Firm*—Robert F. Beers; W. Thom Skeer; Lloyd E. K. Pohl

[57] ABSTRACT

Unvulcanized or partially vulcanized rubber is coated with a coating polymer capable of co-vulcanizing with the rubber and having functional groups capable of reacting with an adhesive. The coated rubber is then subjected to vulcanizing conditions. When the treated rubber surface is bonded to an adhesive, the functional groups react with the adhesive forming strong bonds.

8 Claims, No Drawings

METHOD OF OBTAINING STRONG AND DURABLE ADHESION TO RUBBER THROUGH CHEMICAL COVALENT BONDS

BACKGROUND OF THE INVENTION

1. Field of the Invention

This invention relates to a method for bonding rubber to adhesives.

2. Description of the Prior Art

Many treatments of polyolefin and hydrocarbon rubber surfaces to improve their joinder to dissimilar materials such as epoxy, polyurethane, polyester and acrylic are well known. For example, polyhydrocarbon materials are prepared for adhesive bonding by sulfuric acid etching photosensitized oxidation, flame oxidation, halogenation corona or glow discharge, gamma, ultraviolet or electron irradiation, graft copolymerization and other methods of chemical modification of the surface. These methods all introduce polar chemical groups into the non-polar polyhydrocarbon and increase such forces of adhesion as hydrogen bonding and dipole interactions. In addition the treatments may increase the surface area for bonding or may chemically crosslink the surface to be bonded, thus eliminating cohesively weak surface layers. However, hydrogen bonding and dipole interactions are an order of magnitude weaker than true covalent chemical bonds. Furthermore these adhesive forces are disrupted completely as soon as moisture penetrates along the bond line and adhesive failure results. The graft copolymerization techniques do allow the possibility of covalent chemical bond formation but require an additional lengthy step in the process.

Concentrated acid etching, oxidation, and radiation treatments particularly in the presence of oxygen also can provide the possibility for covalent bond formation with adhesive, but these drastic treatments also break covalent bonds near the rubber surface resulting is stressed and often brittle layers.

SUMMARY OF THE INVENTION

According to this invention rubbers containing unsaturation (such as nitrile rubber, SBR, polybutadiene, butadiene copolymers polyisoprene, isoprene copolymers, chloroprene and the like) are joined with adhesives such as epoxy, polyurethane and the like by means of a coating material. The coating material is applied to the rubber surface and co-vulcanized with the rubber prior to application of the adhesive and has functional groups that react with the adhesive when it is later applied. Bonds which have strengths greater than the cohesive strengths of the rubbers and which maintain durability in the presence of moisture are achieved.

DESCRIPTION OF THE PREFERRED EMBODIMENTS

To practice this invention, the surface of unvulcanized or partially vulcanized rubber stock compounded by means known to the art is coated by brush, spray, spatula, roller, dip or other application method known to the art with a polymer, hereinafter called the coating polymer, capable of co-vulcanizing with the rubber stock and having chemical functional groups capable of reacting with the desired adhesive. The coating polymer may be a neat liquid, a mixture of neat liquid with reinforcing filler and other vulcanizing ingredients or may be applied as a solution, i.e. as a polymer dissolved in solvent or as a suspension. A solid coating polymer may be applied from a melt, from a solution or by otherwise being placed in intimate contact with the rubber to be bonded. After allowing suitable time for the rubber stock and the coating polymer or solution of coating polymer to mutually dissolve, wet one another or interact with one another and after solvent removal, the rubber stock is heated and vulcanized. The longer the vulcanization time, the greater the extent of vulcanization and the greater the hardness and modulus. The vulcanizing conditions ensure co-vulcanization of the coating polymer on the surface and below the surface of the rubber. The treated rubber surface is finally bonded using the desired adhesive system.

The strength of attachment between the coating polymer and the rubber, and between the coating polymer and the adhesive depends on the number of covalent bonds formed. The number of covalent bonds formed is, in turn, dependent on the establishment of intimate interaction between the coating polymer and the rubber and between the coating polymer and the adhesive and on the number, the type and the reactivity of chemical functional groups present in each of these materials.

Intimate interaction is dependent on (1) surface wetability i.e., ability of a liquid to a spread on a surface, (2) mutual compatability of coating polymer with the rubber, (3) contamination of mating surfaces, (4) the method chosen for applying the coating polymer. Chemical reactivity depends on the kind and concentration of reactive chemical groups For example, the degree of unsaturation of the rubber and coating and the final mechanical properties depend on the length of polymer molecules between chemical crosslinks to the rubber and to the adhesive, on the chemical nature of the coating polymer on the cohesive strengths of the layers of materials and on the number of bonds formed between the materials in the system. Although solid coating polymers may be used, liquid coating polymers are preferred.

The preferred coating polymer is a liquid polymer having molecular weight of from about 1000 to 5000 having two or more chemical functional groups capable of reaction with the chosen adhesive system containing unsaturation for reaction with the rubber and easily applicable by brushing, spraying, spreading, rolling, dipping or other means known to the art. It should be a material which rapidly interacts with the rubber and adhesive.

The following specific examples are intended to illustrate but not limit the invention.

EXAMPLE 1

Strips of unvulcanized styrene butadiene rubber (SBR) stock (1.0"×3.0"×0.25") were coated with liquid amine terminated butadiene nitrile rubber (ATBN). The strips were allowed to stand at ambient temperature for 4–48 hours (preferably 16–24 hours). The strips next were vulcanized by heating from the untreated side only for ½–16 hours (preferably 290°–320° F.) while the strips were held between Teflon sheets under pressure of 0.12–1.8 psi (preferably 0.6–1.0 psi). The strips were cooled to room temperature prior to application of adhesive. For comparison, additional strips of SBR stock were first vulcanized and then cooled to room temperature and given a sulfuric acid etch. The strips were placed in concentrated sulfuric acid at room temperature for 5–50 seconds (preferably 30 seconds), washed with running tap water, immersed in saturated sodium bicarbonate solution for 5-50 minutes (preferably 30 minutes), washed again with tap water, rinsed with distilled water and dried in vacuum at room temperature for 8-24 hours (preferably 16 hours). Still other strips to be used for comparison were given no surface treatment at all.

Substrates (2"×4"×0.06") of 1020 steel were buffed to bright metal with a wire sheel and etched with chromic acid solution for 10 minutes at 60° C. The etching solution was made by cautiously adding 1200 ml of concentrated sulfuric acid to a solution of 169 gm of sodium dichromate in 150 ml of distilled water. After removal from the etching bath the steel were thoroughly washed with running tap water, rinsed with distilled water, dried in vacuum for 6 hours and used immediately.

Treated and untreated rubber surfaces were bonded to the clean etched steel using an epoxy adhesive made from 9.5 gm of Epon 828 and 3.25 gm of Ciba Geigy 955.

The bonded specimens were allowed to stand 72 hours while the epoxy adhesive curved. Adhesive 90° peel strengths were measured using an Instron Tester at a speed of 2 in/min.

TABLE I

| Surface Treatment | Peel Strength (lb/in) | Failure Mode |
|---|---|---|
| None | 5.2 | Rubber/Epoxy Adhesive |
| ATBN | 68.0 | Rubber Cohesive |
| Sulfuric Acid | 49.0 | Rubber Cohesive (a) |

(a) Failure within an embrittled surface layer

EXAMPLE 2

Strips (1 0"×3.0"×0.25") of unvulcanized nitrile rubber stock were treated with ATBN and vulcanized as in Example 1.

Two strips of rubber then were bonded to each other using the epoxy adhesive and procedure of Example 1. Separate strips were vulcanized with no treatment, and then bonded to each other with the same adhesive. The bonded rubber strips were peeled apart at 180° using an Instron Tester at 2 in/min.

TABLE II

| Surface Treatment | Peel Strength (lb/in) | Failure Mode |
|---|---|---|
| None | 2.3 | Rubber/Epoxy Adhesive |
| ATBN | 19.0 | Epoxy Cohesive |

EXAMPLE 3

Two strips of unvulcanized nitrile rubber were treated with ATBN and then vulcanized as in Example 1. Two strips of the same rubber stock were first vulcanized and then given a sulfuric acid etch like that given the SBR strips in Example 1.

Pairs of identically treated strips were bonded to each other using the epoxy adhesive and techniques of Example 1. The bonded pairs of rubber strips were then immersed in boiling salt water (3 wt % sodium chloride in distilled water) for various times. Samples were peeled (180°) on an Instron Tester at a crosshead speed of 2 in/min.

TABLE III

| Surface Treatment | Time in Boiling Saltwater (hr) | Peel Strength (lb/in) | Failure Mode (a) | | |
|---|---|---|---|---|---|
| | | | R/R | R/E | E/E |
| ATBN | 0 | 48.0 | 100 | 0 | 0 |
| | 168 | 23.5 | 50 | 50 | 0 |
| | 360 | 15.5 | 10 | 50 | 40 |
| Sulfuric Acid | 0 | 45.7 | 100 (b) | 0 | 0 |
| | 168 | 6.7 | 50 (b) | 50 | 0 |
| | 360 | 8.6 | 80 (b) | 20 | 0 |

(a) Failure Mode:
R/R = Rubber Cohesive Failure
R/E = Separation at Rubber/Epoxy Interface
E/E = Epoxy Cohesive Failure
(b) Sulfuric acid etch led to separation between the brittle etched surface layer and the rubber body.

EXAMPLE 4

Strips of unvulcanized SBR stock were treated with ATBN and then vulcanized as usual. Additional strips were first vulcanized and then treated with ATBN. Following the treatment with ATBN, some of the strips were re-subjected to vulcanization conditions before bonding while others were bonded immediately. Control strips were given no surface treatment.

Bonded samples were peeled at 180° using an Instron Tester at a crosshead speed of 2 in/min.

TABLE IV

| Surface Treatment | Rubber Vulcanized | Peel Strength (lb/in) | Failure Mode | | |
|---|---|---|---|---|---|
| | | | R/R | R/E | E/E |
| None | Yes | 6.6 | 0 | 85 | 15 |
| ATBN | Yes | 3.4 | 0 | 0 | 100 |
| ATBN, revulcanize | Yes | 3.2 | 0 | 25 | 75 |
| ATBN | No | 26.2 | 60 | 20 | 20 |

From the foregoing examples, it can be seen that the method described herein has advantages in that bond strengths exceeding those of cohesive strengths of highly vulcanized rubbers are achieved using adhesive systems such as epoxy, polyurethane, etc., which permit strong bonding of rubber to dissimilar substrates such as metals, glasses, etc.; that adhesion having the strength of chemical bonds (ten fold stronger that usual adhesive forces like hydrogen bonds van der Waals forces, etc.) results; and that the bonds formed are durable and resist degradation by moisture.

The feature of the method that produces the advantages is the utilization of the vulcanization process to introduce covalent chemical bonds between the vulcanized rubber and the adhesive system.

What is claimed is:

1. A method for introducing covalent bonds between vulcanized rubber and an adhesive comprising the steps of:
   coating a surface of unvulcanized or partially vulcanized rubber with a coating polymer capable of co-vulcanizing with the rubber and having functional groups capable of reacting with said adhesive;
   co-vulcanizing the rubber and coating polymer and applying said adhesive to the coated surface whereby said adhesive reacts with said functional groups.

2. A method according to claim 1 wherein said rubber is an unsaturated rubber.

3. A method according to claim 2 wherein said rubber is selected from the group consisting of syrene-butadiene rubber, nitrile rubber, polybutadiene, butadiene copolymers, polyisoprene isoprene copolymers, and chloroprene.

4. A method according to claim 3 wherein said coating material is liquid amine-terminated butadiene-nitrile rubber.

5. A method according to claim 4 wherein said covulcanization is carried out by heating the coated rubber for from ½ to 16 hours at a temperature of between 220° and 360° F.

6. A method according to claim 5 wherein said adhesive is an epoxy adhesive.

7. A method according to claim 6 wherein said rubber is styrene butadiene rubber.

8. A method according to claim 6 wherein said rubber is nitrile rubber.

* * * * *